Figure 1:
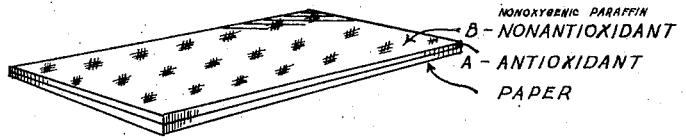

Feb. 25, 1941.  S. MUSHER  2,233,141

ANTIOXIDANT FOR PACKAGING MATERIALS

Filed Feb. 16, 1933

Sidney Musher
INVENTOR.

BY Sol Shapiro
ATTORNEYS.

Patented Feb. 25, 1941

2,233,141

UNITED STATES PATENT OFFICE 2,233,141

ANTIOXIDANT FOR PACKAGING MATERIALS

Sidney Musher, New York, N. Y., assignor to Musher Foundation Incorporated, New York, N. Y., a corporation of New York Application February 16, 1938, Serial No. 190,887

12 Claims. (Cl. 91—68)

This invention relates to the use of antioxidants in connection with packaged articles and materials, and to wrapping and packaging materials used for products subject to oxidative deterioration, which wrapping or packaging materials carry antioxidants, or related materials to prevent oxidative deterioration, as well as to methods for preparing such packaged articles and materials used in packaging such products subject to oxidative deterioration.

Antioxidants of various types have been used in the prior art in connection with a wide variety of materials, both organic and inorganic, edible and inedible, in order to protect the latter against oxidative deterioration. The use of antioxidants has particularly been indicated in connection with organic products, and more desirably those of edible character which are packaged and shipped or stored for consumption after shipping or storage. Antioxidants that have been proposed include the vegetative antioxidants, such as those derived from non-oil-containing materials like cereals and grains, and the oil-containing products such as the oil-containing seeds, nuts and dried fruits, both classes of which vegetative materials may be grouped as the germinative portions of plant life, gum guaiac, lecithin, etc. Now while a wide variety of materials have heretofore been suggested in the art for use as antioxidants in connection with diverse substances subject to oxidative deterioration, in every case it has been suggested that it is essential to contact the antioxidant or composition containing it with the substance or material to be protected against oxidative change. Where the products to be protected were liquid in character, the antioxidants were either dissolved in it or suspended in such liquid. Where the products were solid, the antioxidants were either mixed through the powdered material, or else coated on the outside of the solid or discrete mass of substance to be protected. Even where the antioxidants were carried on the packaging material used for wrapping substances subject to oxidative change, the antioxidants were placed on the surface of such wrapping or encasing material in order to contact with the substance wrapped or encased, and to protect it against oxidative deterioration.

By the fact that in all prior art procedures it was thought necessary to contact the antioxidant with the material to be protected against oxidative deterioration, considerable limitation on the character or amount of antioxidant that could be used was involved.

Among the objects of the present invention is included the protection of substances against oxidative deterioration by their inclusion in packages or encasement in packaging materials wherein antioxidants are employed out of direct contact with the substance to be protected against oxidative deterioration, so that the amounts of antioxidants employed, or their character or quality may be varied at will, whether or not the substances being protected are utilized for edible purposes or not.

Other objects of the invention include the utilization of particular types of sizes on paper and related materials, which sizes particularly exhibit antioxidative or antioxygenic properties.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

Figure 2:
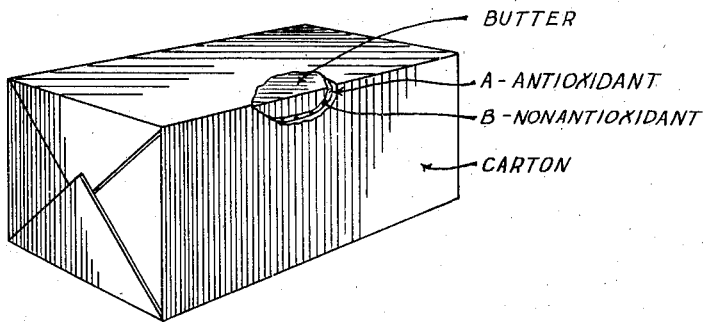
Figure 3:
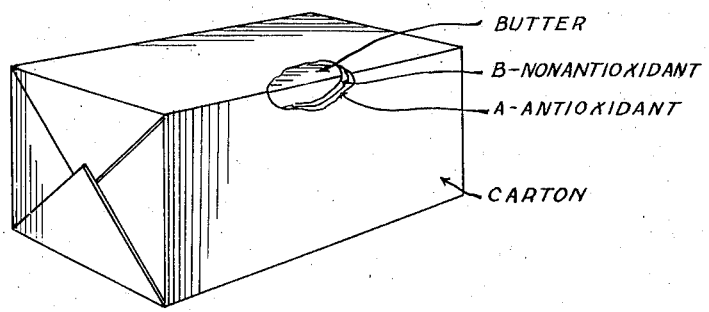

In accordance with that more detailed description, there is shown in the accompanying drawing, in Figure 1, a perspective view of a sheet of paper modified in accordance with the present invention; in Figure 2, a packaged product encased in a wrapping material in accordance with the present invention; and in Figure 3, a modification of a packaged product, in accordance with the present invention.

In accordance with the present invention, it has been found that it is not necessary for the antioxidant or antioxygenic substance to be in direct contact with the material to be protected against oxidative deterioration, but that the antioxidant or antioxygenic substance may actually be segregated from the material to be protected against oxidative deterioration by a layer of oil or fat or wax, or paper treated with such materials, etc. And even though there is no direct contact between the substance to be protected and the protecting material, nevertheless the sphere of action of the protecting substance extends to the material to be protected, and prevents oxidative deterioration of the latter. The layer through which the protecting material exhibits its action should be permeable to such action of the antioxidant and may vary in character, so long as it is not metallic or vitreous. For example, it has been found that if paper is first coated, sprayed or otherwise treated with the desired antioxidant, and then coated with a layer of material which permits the antioxidant to exhibit its action through such layer to a substance wrapped in such paper, there is substantially as effective retardation of oxidative deterioration of the packaged product as if the antioxidant were in direct contact with the material to be protected. This is particularly true with paper or other packaging materials carrying antioxidants and over such antioxidants carrying paper there is applied a coating of paraffin, mineral oils, waxes, hydrogenated glyceride fats, or other substances commonly used in the preparation of wax impregnated and oil papers.

Because of the fact that the antioxidant is not in direct contact with the substance to be protected, any kind of antioxidant may be utilized for the protection of any type of substance subject to oxidative deterioration, subject only to the limitation that the substance to be protected may be packaged in some manner. Thus chemicals or antioxidants which would be considered to be toxic or non-permissible for food products can be utilized in accordance with the present invention, because the food or edible substance does not actually contact with the antioxidants, and yet such food or material subject to oxidative deterioration is given full protection.

In addition, the invention overcomes the difficulties which have been experienced in the inclusion of antioxidants in the wax coatings or other surface applied materials where there is a marked influence on the properties of such wax or similar coating. For example, paraffin wax or other types of coatings have been applied to paper to produce moisture-proof or grease-proof materials. It has been proposed to include in such moisture or grease-proof coatings antioxidants of various types. But the incorporation of the antioxidants directly into the paraffin wax or other coating frequently increases the permeability of such coating to moisture or fats or oils. Because by following the present invention, it is not necessary to include the antioxidants in the layer in direct contact with the substance subject to oxidative deterioration, these difficulties are entirely overcome, and the antioxidant effect secured without militation against moisture or grease-proof properties, or other desired characteristics of particular types of coatings.

Even though the antioxidant is not in direct contact with the product subject to oxidative deterioration, marked protection is secured in a packaged product against development of rancidity or other type of oxidative deterioration. The invention can be utilized in connection with other types of packaging materials than paper or flexible substances, and is directly applicable to paper, boards, cans or bottles, wood containers of various types, etc. And the packaging of any kind of materials include food products, such as lard, butter, bacon, potato chips, biscuits, candies, coffee, milk, ice cream, frozen pork, and non-edible substances, such as rubber, resins, gums, tobacco, cosmetics, pharmaceuticals in general, drugs, etc.

Not only is there retardation of oxidative deterioration of the product packaged, but where the packaging medium is subject to oxidative deterioration, protection of the latter is also secured. Thus printing inks, paraffin and waxes in general, casein and other products normally applied to paper are subject to oxidative deterioration. Printing inks on wrappers frequently give rise to undesirable odors due to oxidative deterioration, as well as in connection with papers used for magazine stock, etc. These odors are due to oxidation of the printing ink, or of sizing materials applied to such products. The utilization of antioxidants in accordance with the present invention avoids such oxidative deterioration in the packaging material, as well as in the product packaged.

Because of the particular application in connection with papers and similar wrapping materials, the present invention lends itself to the utilization of novel types of sizing materials for paper and board materials in general. Ordinary starch is normally and frequently applied as a coating on paper and board to obtain a particular type of finish, and also grease resistance. But such starch possesses substantially no antioxygenic activity. In place of starch, the present invention includes the utilization of starchy vegetative materials having a starch content sufficient to satisfy the requirements in this connection, but which also exhibit antioxidant properties, so that such vegetative substances exhibit a dual function and character. Thus in lieu of starch employed for such purposes, there may be utilized cooked oat flour, corn flour, rye flour, and similar cereal flours that are high in starch content and possess antioxygenic activity. In this way, the effect of the starchy material is secured on the paper and board at the same time that oxidative deterioration of the packaged product, or of the packaging material, or of printing ink on the latter is detained. Analogously, in the cases where paper is sized with a product high in protein, such as casein, vegetative flours, such as soya bean flour, may be employed which are high in antioxidant activity. Whether of starchy or protein character, the cereal and grain flours may be used as such for the sizing of such paper, and the paper subsequently employed for packaging material directly, or such paper may carry the water-proofing or grease resisting coating, as set forth above, applied over such sized paper or board, or similar wrapping material. The starchy or high protein cereal or grain flours may be used as such, or may be subjected to various types of treatments to enhance the antioxygenic effect. For example, soya flour may be activated by hydrolysis, such as by heating full fat soya bean flour, soya bean press cake, or an antioxygenic extract of soya bean flour, with a 1% solution of acetic acid for 5 hours at 100° C., and then removing the acid. Or the oat or other cereal flour may be boiled to produce gelatinization, and then desirably dried, thus making it directly available to the paper manufacturer for use.

The antioxidants employed in accordance with the present invention include any desired types of antioxidants. They may be vegetative in character, such as the cereals and grains and oil-containing seeds including oat, rye, barley, soya bean, sesame, peanut, either in flour or other reduced or finely divided condition, or other types of vegetative materials may be included, such as cocoa, tea, coffee, spices, crude sugar, rice bran, etc. Or the antioxidants may be chemical in character, such as hydroquinone, alphanaphthol, maleic acid, phenols, quinones and amines. Or they may be combined antioxidants, such as lecithin-dextrose combination, hydroquinone-dextrose, tartaric acid-dextrose, etc. For example, tartaric acid and dextrose heated in cottonseed oil to 400° F. in the proportions of equal parts by weights of tartaric acid and dextrose gives a highly active material which can be applied to paper in the manner set forth above, or taught herein, and utilized as the antioxygenic substance. Or the hydrolized vegetative antioxidants obtained, for example, by subjecting soya bean flour to hydrolysis or by heating soya bean flour in an oil may be utilized, such materials having pronounced antioxygenic activity.

The packaging materials employed in accordance with the present invention include papers and boards, such as those commonly used as greaseproof, parchment, glassine, or their substitutes, sulphite papers of all kinds, both coated and uncoated, boards, whether chip boards or coated stock, and the various types of materials generally employed for packaging biscuits, crackers, milk including milk bottle containers, milk bottle caps, etc., or they may be rendered grease resistant by special application, such as resinous substances, etc.

The invention may be illustrated by specific features of various types. In connection with the manufacture of wax or oil papers, it is desired first to coat the papers with the antioxidants desired. For example, oat flour and water may be made into a mixture using 20% of oat flour and 80% of water, and such mixture applied to paper, dried, and the wax or other application then made to the treated paper. In such mixtures of cereal flours with water, the addition of a small percentage, such as 1% of cooked oat flour, starch, tapioca flour, etc., is desirable in order to hold the oat flour solids in suspension, and such compositions then utilized as a surface application for the papers as part of the usual manufacturing operation, for example, by spraying over the paper, or by dipping the paper into a bath of such composition. Or a mixture can be prepared comprising 10% hydroquinone and 90% water, and the paper passed through a bath of such composition. Or the activated soya bean flour may be applied to the paper or board as indicated above. The antioxidants may be dusted on or directly applied to the paper without any vehicle, and the water-proof or grease-proof or other special type of coating then applied, or the antioxidant may be in solution or suspension as in organic solvents, etc. The volatile organic solvents are employed as the vehicle or suspending medium for the antioxygenic substance. Rapid drying may be secured making the paper or board, or similar packaging material available for prompt application of the water-proofing, grease-resisting, or other special topcoat.

In lieu of using starch as a sizing, the antioxidants, such as the cereal flours containing a high percent of starch may be employed. Thus oat flour may be boiled in water and, if desired, milled as in a colloid mill to reduce its viscosity, or small amounts of organic solvents may be applied for the same purpose, and such high starchy product, whether oat or other cereal flour, possesssing antioxygenic properties applied to the paper in lieu of ordinary starch, giving an antioxidant material without increase in cost of the finished paper.

Where paper or board is to be printed, the printing may be applied following the application of the oat flour or other antioxidant, and marked retardation in the development of the objectionable printing ink odors due to oxidative deterioration will be observed. Or the printing may be carried out in connection with such paper or board, the antioxidant composition then applied in such manner as not to interfere with or mask the printed material, followed by application of any special coating desired.

After application of the antioxidants to the packaging material, the latter, whether paper or other product, may be subjected to coating or impregnation with any desired topcoat, particularly excluding antioxidants from such topcoat. Thus such protecting coatings or impregnating media may include paraffin, paraffin oil, glyceride oils, hydrogenated glyceride oils, or other substances or materials commonly used for the coating of papers, and which are permeable to the action of the antioxidants through such coating to protect the material packaged in such wrapping or encasing materials.

It is a remarkable observation that even where the paper carries a topcoat of paraffin or other similar coating, the antioxidant not in direct contact with the substance to be protected against oxidative deterioration is nevertheless protected, and the benefit of the antioxidant obtained without direct contact with the material packaged. Thus if a sulphite paper is sized with oat flour, and then impregnated with paraffin, and such paper used for wrapping pork which goes into cold storage where it may be stored for several months, a marked improvement in the keeping qualities of that pork will be observed, even though the oat flour is not in direct contact with the pork, and even though the paper is in discontinuous surface contact with the packaged product. Where the coating material used on paper is susceptible to oxidation as, for example, in the case of paraffin oils, and particularly where wrapping materials carrying paraffin oils are utilized for storage purposes over relatively long periods of time, the use of these antioxidants as a sizing on paper prior to the application of the paraffin or other topcoat gives marked improvement against oxidative deterioration of the coating material, as well as of the product encased in such wrapping material.

Paper milk bottles may be treated with oat flour followed by the application of the paraffin topcoat, and a markedly superior packaging product thus obtained. Oat flour added directly to paraffin used for the coating of paper milk products will prevent oxidation of the milk, but there is a tendency to increase the moisture penetration in such cases, with the possibility that such paper milk bottle on standing may bulge and the cardboard soften. By the application of the oat flour or other antioxidant to the board prior to the application of the paraffin, followed by such coating with paraffin in the usual way, not only is the antioxidant effect secured for the milk, but there is no penetration of moisture, the board does not soften, and there is no bulging of the bottle.

It is particularly important to note that normally toxic antioxidants, such as hydroquinone, alphanaphthol, etc. can be used as a sizing on paper in accordance with the present invention, followed by the application of a protective topcoat, such as paraffin or other material, enabling such products to be utilized in connection with edible materials to secure the desired antioxidative effect without any possible contamination of the edible product with the antioxidant.

While paper board and other more or less flexible packaging materials have been emphasized for use in connection with the present invention, the invention is equally applicable to packaging in barrels, or other wooden containers, in glass, etc., as well as metal containers. The antioxidant may be applied as a dusted on or other coating to the container regardless of the type employed, followed by the application of paraffin, silicate, etc. Thus butter, cheese, margarine, fish and similar materials packed in wooden pails may be protected in accordance with the present invention.

Cans employed for packaging of citrus fruit juices, evaporated milk, or other liquid or solid food products may similarly be treated by application of any desired antioxidant, followed by a topcoat or other similar product.

The invention may be utilized similarly in the treatment of parchment or greaseproof liners or similar materials used in the packaging of food products particularly. Thus such liners may have the desired antioxidants applied thereto, followed by the protective coating. Or, if desired, in the packaging with liners, two different liners may be utilized, one carrying the antioxidant and the other carrying the waterproof or greaseproof material, with the antioxidant liner placed on the outside of the normal greaseproof or waterproof liner. Or the ordinary grease proof or waterproof liner may be used for wrapping butter, lard or similar material, and the antioxidant applied to the inner face of the carton, so that without direct contact of the antioxidant with the butter, lard or similar material, oxidative protection is secured, even though the antioxidant is carried on the carton not on the liner itself. It will be apparent that the present invention enables various types of packaging to be carried out by utilizing the features taught herein.

The drawing illustrates various features of the present invention. Thus in Figure 1, a sheet of paper may carry an antioxidant layer A and a top or outer coating of non-antioxygenic character, such as paraffin, or other similar coating. Such packaging material may be utilized for producing a packaged product as illustrated in Figure 2, the paper being formed into the carton about the butter print. In such case, as shown in Figure 2, there will be a paraffin or similar coating layer between the antioxidant layer A and the butter. Or as illustrated in Figure 3, the butter may be wrapped in two liners, the inner one being of non-antioxygenic character, while the other liner carries the antioxidant, the product then being encased in the usual carton. Again in such instances, it will be noted that the antioxidant will not be in direct contact with the product, such as butter, being protected. And accordingly because antioxidants can be utilized for their special effects without direct contact with the product being protected, any type of character of antioxidant may be employed with any type of product to be protected, whether the latter is of edible or non-edible character.

The present application is a continuation in part of application, Serial No. 144,489, filed May 24, 1937, and is continued in part in application, Serial No. 276,413, filed May 29, 1939. The present specification and claims are broadly directed to the use of antioxidants broadly under a paraffin or other water repellent film and are specifically directed to the use of antioxidants of vegetative origin under said film. The continuing application, Serial No. 276,413 is specifically directed to the use of hydroquinone and other similar aromatic compounds under the paraffin film.

By the term "seed" is also included the nuts and fruits.

Having thus set forth my invention, I claim:

1. A process of producing a wrapping paper comprising applying to the paper and coating the surface thereof with a antioxygenic vegetative flour and then subsequently applying a water repellent non-antioxygenic paraffin wax surfacing to such paper.

2. A process of preparing an antioxygenic wrapping paper which comprises passing the paper through a bath containing oat flour and water to obtain complete surface coverage on said paper, drying the paper and then applying a wax covering over the oat flour.

3. A process of making a flexible sheet packaging material comprising first applying to the sheet packaging material a surfacing of an antioxidant which is spread over the entire surface thereof and then applying a non-antioxygenic water repellent coating material.

4. A flexible sheet packaging material which has been surfaced with an antioxidant which is spread over the entire surface thereof, and which contains over said surfacing of said antioxidant a non-antioxygenic water repellent wax material which has been spread over the surface of said packaging material and over the surface of said antioxidant.

5. A process of making a paper packaging material comprising first applying to the paper packaging material a surfacing of an antioxidant which is spread over the entire surface thereof and then applying a non-antioxygenic water repellent coating material, said antioxidant being of vegetable origin, and said water repellent coating material being paraffin.

6. A flexible sheet packaging material which has been surfaced with an antioxidant which is spread over the entire surface thereof, and which contains over said surfacing of said antioxidant a non-antioxygenic water repellent wax material which has been spread over the surface of said packaging material and over the surface of said antioxidant, said antioxidant being of vegetable origin.

7. A process of making a flexible sheet wrapping material comprising first treating the wrapping material with an antioxidant and then applying as an overcoat a water repellent non-antioxygenic coating material.

8. A flexible sheet wrapping material which has been treated with an antioxidant, and which contains over said treated wrapping material an overcoat of a water repellent non-antioxygenic coating material.

9. A process of making a flexible sheet wrapping material comprising first treating the wrapping material with an antioxygenic cereal flour and then applying as an overcoat a water repellent non-antioxygenic coating material.

10. A process of making a flexible sheet wrapping material comprising first treating the wrapping material with antioxygenic gum guaiac and then applying as an overcoat a water repellent non-antioxygenic coating material.

11. A process of making a flexible sheet wrapping material comprising first treating the wrapping material with an antioxygenic seed flour and then applying as an overcoat a water repellent non-antioxygenic coating material.

12. A process of making a flexible sheet wrapping material comprising first treating the wrapping material with antioxygenic soya flour and then applying as an overcoat a water repellent non-antioxygenic coating material.

SIDNEY MUSHER.